United States Patent
Lee

(10) Patent No.: US 9,578,582 B2
(45) Date of Patent: Feb. 21, 2017

(54) WIRELESS COMMUNICATION SYSTEM FOR IMPROVING THE HANDOFF OF THE WIRELESS MOBILE DEVICE ACCORDING TO GEOGRAPHIC INFORMATION AND A METHOD FOR IMPROVING HANDOFF

(71) Applicant: WISTRON CORP., New Taipei (TW)

(72) Inventor: Shi-Rui Lee, New Taipei (TW)

(73) Assignee: Wistron Corp., New Taipei (TW)

( * ) Notice: Subject to any disclaimer, the term of this patent is extended or adjusted under 35 U.S.C. 154(b) by 296 days.

(21) Appl. No.: 13/958,377

(22) Filed: Aug. 2, 2013

(65) Prior Publication Data

US 2014/0295850 A1 Oct. 2, 2014

(30) Foreign Application Priority Data

Mar. 27, 2013 (TW) .............................. 102110819 A

(51) Int. Cl.
*H04W 36/00* (2009.01)
*H04W 36/32* (2009.01)

(52) U.S. Cl.
CPC ......... *H04W 36/32* (2013.01); *H04W 36/0055* (2013.01); *H04W 36/0083* (2013.01); *Y02B 60/50* (2013.01)

(58) Field of Classification Search
CPC ...... H04W 36/00; H04W 36/16; H04W 36/24; H04W 36/30; H04W 36/32; H04W 36/08; H04W 36/36; H04W 36/38
USPC ............. 455/436, 440, 441, 437, 438, 456.1
See application file for complete search history.

(56) References Cited

U.S. PATENT DOCUMENTS

| | | | | |
|---|---|---|---|---|
| 6,167,268 A | * | 12/2000 | Souissi | H04W 48/16 455/434 |
| 6,385,460 B1 | * | 5/2002 | Wan | H04W 52/0254 455/434 |
| 7,251,491 B2 | | 7/2007 | Jha | |
| 7,904,112 B2 | * | 3/2011 | Bitran | H04W 88/06 455/41.2 |
| 8,781,465 B2 | * | 7/2014 | Kim | H04W 36/30 455/160.1 |
| 2005/0190105 A1 | * | 9/2005 | Ishizu | H04B 7/086 342/383 |
| 2007/0004407 A1 | | 1/2007 | Biggs | |
| 2007/0091847 A1 | | 4/2007 | Lee | |
| 2011/0050503 A1 | | 3/2011 | Fong et al. | |
| 2013/0084856 A1 | * | 4/2013 | Prasad | H04W 36/0088 455/434 |

* cited by examiner

*Primary Examiner* — Temica M Beamer

(57) ABSTRACT

A wireless communication system for improving the handoff of wireless mobile devices according to geographic information, including: a first station and a wireless mobile device transmitting first geographic information to the first station and receiving from the first station a first scanning-station period, a first threshold velocity, and a first threshold steering angle corresponding to the first geographic information. When the motion speed of the wireless mobile device is greater than the first threshold velocity or the angle at which the wireless mobile device changes its direction of motion is greater than the first threshold steering angle, the wireless mobile device transmits the second geographic information to the first station and receives from the first station a second scanning-station period, a second threshold velocity, and a second threshold steering angle corresponding to the second geographic information.

10 Claims, 3 Drawing Sheets

WIRELESS COMMUNICATION SYSTEM FOR IMPROVING THE HANDOFF OF THE WIRELESS MOBILE DEVICE ACCORDING TO GEOGRAPHIC INFORMATION AND A METHOD FOR IMPROVING HANDOFF

CROSS REFERENCE TO RELATED APPLICATIONS

This application claims priority of Taiwan Patent Application No. 102110819, filed on Mar. 27, 2013, the entirety of which is incorporated by reference herein.

BACKGROUND OF THE INVENTION

Field of the Invention

The present invention relates to a wireless communication system for improving the handoff of wireless mobile devices, and in particular to a wireless communication system for improving the handoff of wireless mobile devices according to geographic information.

Description of the Related Art

In the modern wireless communication system, a wireless mobile device scans a service station within the region where the wireless mobile device is located according to a scanning-station period pre-stored in the wireless mobile device, and registers at a system service server through the scanned service station. For example, when the wireless mobile device scans a first service station, the wireless mobile device registers at the system service server through the first service station. In addition, the wireless mobile device obtains the signal strength provided by the service station within the region where the wireless mobile device is located, according to the result of a scanning station.

When the wireless mobile device scans the first service station and a second service station, the wireless mobile device may be located, for example, in the overlapping service range of the first service station and the second service station. The wireless mobile device then separately compares the signal strength provided by the first service station and the second service station with a threshold handoff value pre-stored in the wireless mobile device. When the signal strength provided by the first service station is higher than the threshold handoff value and the signal strength provided by the second service station is lower than the threshold handoff value, the wireless mobile device does not hand off to the second service station. In contrast, when the signal strength provided by the first service station is lower than the threshold handoff value and the signal strength provided by the second service station reaches the threshold handoff value, the wireless mobile device hands off to the second service station.

Accordingly, the wireless mobile device determines whether to perform the handoff or not by comparing the threshold handoff value with the signal strength provided by the stations. However, a failure of the wireless mobile device to hand off may still occur. For example, when the first service station cannot provide sufficient signal strength for the wireless mobile device and the wireless mobile device still does not register at (and hand off to) the second service station, the handoff failure occurs. In more specific terms, because the wireless mobile device scans the service stations according to the scanning-station period pre-stored in the wireless mobile device, when the wireless mobile device proceeds away from the first service station at a rapid rate, the wireless mobile device cannot receive sufficient signal strength from the first service station anymore. In addition, because the wireless mobile device does not perform scanning before the next scan and thereby does not register at the second service station, the handoff failure occurs. The remaining situation, such as a handoff delay (it takes time for the wireless mobile device to register at (and hand off to) the stations), the smaller intersection of the service range between the first service station and the second service station results in the handoff failure.

Moreover, because the scanning-station period pre-stored in the wireless mobile device is a fixed period, the wireless mobile scans the service station according to the fixed period no matter whether the wireless mobile device is near the service station or not, or whether the wireless mobile device moves or not. Thus, it leads to higher power consumption or a handoff failure.

Therefore, it is required to provide a new handoff method and a wireless communication system using the same. When the wireless mobile device is near the service station, the wireless mobile device scans the service station according to the longer scanning-station period, or when the wireless mobile device proceeds away from the service station, the wireless mobile device scans the service station according to the shorter scanning-station period so as to resolve the problems of higher power consumption or the failure of handoff.

BRIEF SUMMARY OF THE INVENTION

A detailed description is given in the following embodiments with reference to the accompanying drawings.

In view of this, the present invention discloses a handoff method for changing the scanning-station period of the wireless mobile device to avoid handoff failures and further reduce power consumption.

An embodiment of the present invention discloses a wireless communication system for improving the handoff of wireless mobile devices according to geographic information, including: a first station and a wireless mobile device transmitting first geographic information to the first station and receiving from the first station a first scanning-station period, a first threshold velocity, and a first threshold steering angle corresponding to the first geographic information. When the motion speed of the wireless mobile device is greater than the first threshold velocity or the angle at which the wireless mobile device changes its direction of motion is greater than the first threshold steering angle, the wireless mobile device transmits second geographic information to the first station and receives from the first station a second scanning-station period, a second threshold velocity, and a second threshold steering angle corresponding to the second geographic information.

The action of the above wireless communication system is another embodiment of the present invention, presenting a method for improving the handoff of wireless mobile devices according to geographic information, including: transmitting first geographic information from a wireless mobile device to a first station and receiving a first scanning-station period, a first threshold velocity, and a first threshold steering angle corresponding to the first geographic information, from the first station to the wireless mobile device. When the wireless mobile device detects that its motion speed is greater than the first threshold velocity or detects that the angle deviating from its direction of motion is greater than the first threshold steering angle, the wireless mobile device transmits second geographic information to the first station and receives a second scanning-station period, a second threshold velocity, and a second threshold steering angle corresponding to the second geographic information from the first station.

Moreover, the embodiment of the present invention discloses a wireless mobile device for improving handoff, wherein the wireless mobile device transmits the first geographic information of the first place where the wireless mobile device is located to a first station at which the wireless mobile device has registered and linked to, and receives a first scanning-station period. When the wireless mobile device detects that the motion speed of the wireless mobile device is greater than a predetermined velocity or that the angle deviating from its direction of motion is greater than a predetermined steering angle, the wireless mobile device transmits second geographic information of a second place where the wireless mobile device is located to the first station. After the wireless mobile device receives from the first station a second scanning-station period corresponding to the second geographic information, the wireless mobile device changes the scanning-station period from the first scanning-station period to the second scanning-station period.

The embodiment of the present invention also discloses a wireless communication service station for improving handoff, wherein the wireless communication service station receives the first geographic information of the first place where the first wireless mobile device is located, the first wireless mobile device having registered at and being linked to the wireless communication service station, and the wireless communication service station transmits a first scanning-station period corresponding to the first geographic information back to the first wireless mobile device. When the wireless communication service station detects that the motion speed of the first wireless mobile device or the angle deviating from the direction of motion of the first wireless mobile device exceeds a predetermined velocity or a predetermined steering angle according to second geographic information of a second place where the first wireless mobile device is located from the first wireless mobile device, the wireless communication service station transmits a second scanning-station period corresponding to the second geographic information back to the wireless mobile device to make the first wireless mobile device change the scanning-station period from the first scanning-station period to the second scanning-station period.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
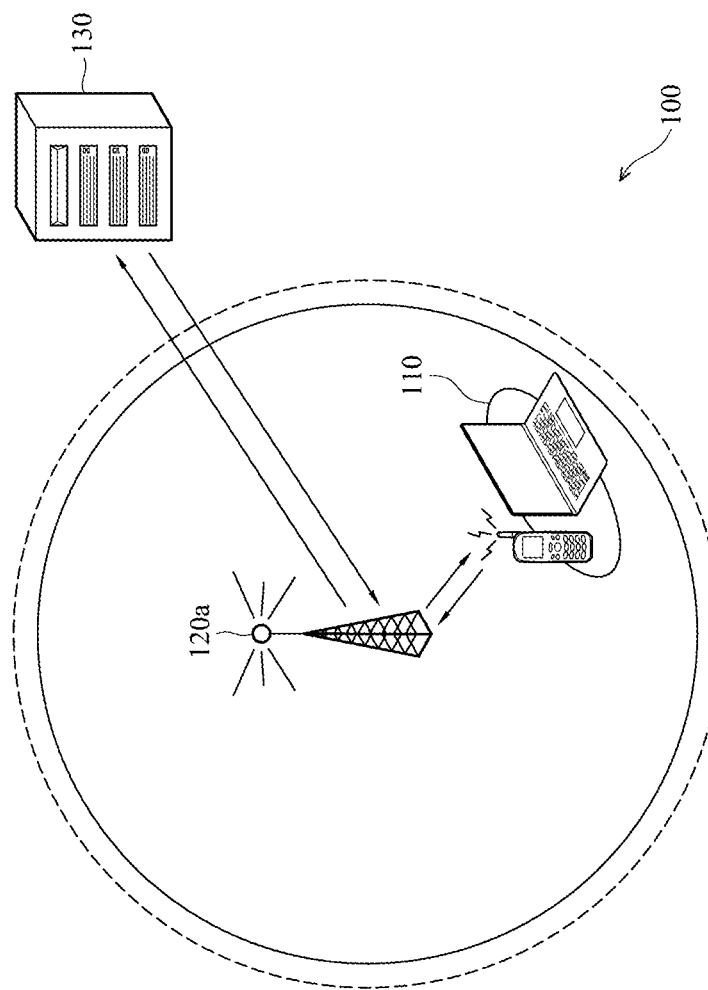
FIG. 1 is a diagram for illustrating the wireless communication system, according to an embodiment of the present invention.

FIG. 1 is a diagram for illustrating the wireless communication system, according to an embodiment of the present invention. As shown in FIG. 1, a wireless communication system 100 comprises: a first station 120a, a wireless mobile device 110, and a system service server 130 (or Internet Service Provider, ISP, server). The first station 120a has a station service range (denoted by the solid line) and a maximum station service range (denoted by the dotted line).

Figure 2:
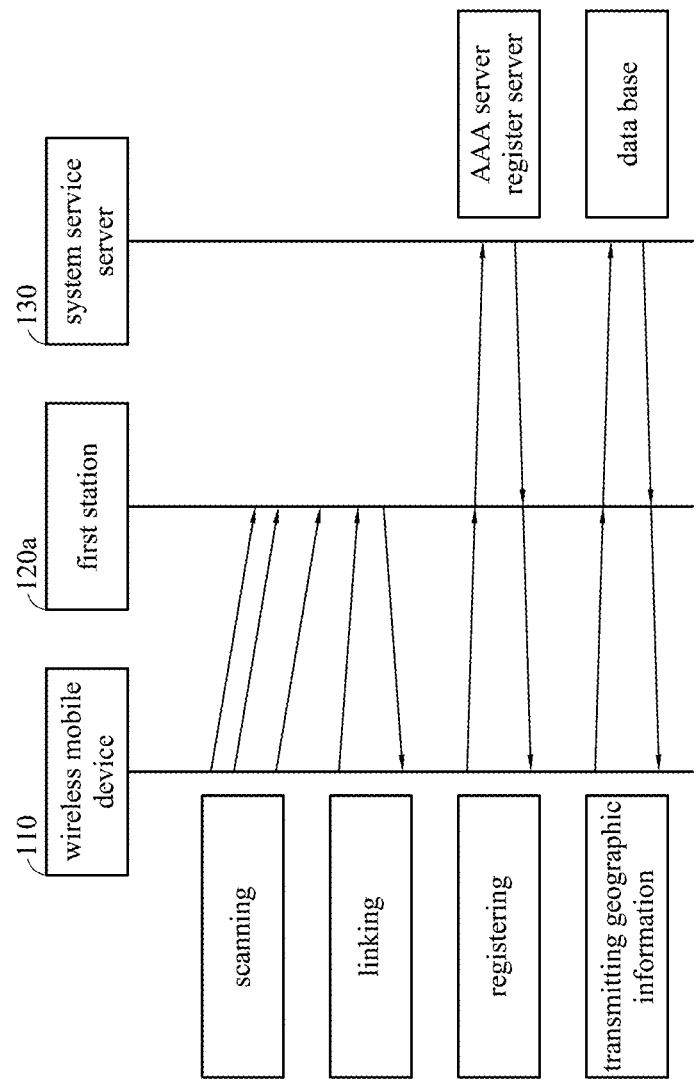
FIG. 2 is a flow chart illustrating the communication between the wireless mobile device and the system service server in FIG. 1.

FIG. 2 is a flow chart illustrating the communication between the wireless mobile device 110 and the system service server 130. Referring to FIG. 1 at the same time, the wireless mobile device 110 performs the steps of scanning, linking, registering, and transmitting geographic information. The wireless mobile device 110 performs scanning to search for the service station in the region where the wireless mobile device 110 is located and to obtain the signal strength provided by the service station, wherein the wireless mobile device 110 consumes large amounts of power to perform the scan. When the wireless mobile device 110 scans the first station 120a, the wireless mobile device 110 will establish a link with first station 120a and register at the system service server 130 through the first station 120a at the same time. The system service server 130 may comprise an AAA (Authentication, Authorization, Accounting) server, location server, or register server, wherein the above system service server is only an example and is not used to limit the schematic of the wireless communication of the present invention. When the system service server 130, according to the register information transmitted from the wireless mobile device 110, determines that the wireless mobile device 110 is the user of the system service server 130, the first station 120a can be used by the wireless mobile device 110 for communicating.

The system service server 130 already has every station's geographic information on its own. Therefore, when the system service server 130 transmits first geographic information to the first station 120a, the system service server 130 performs computing according to the first geographic information received by the first station 120a, further getting a first scanning-station period, a first threshold velocity, and a first threshold steering angle corresponding to the first geographic information from the database. Through the first station 120a, the wireless mobile device 110 receives the first scanning-station period, the first threshold velocity, and the first threshold steering angle corresponding to the first geographic information, which are computed by the system service server 130. And then, the wireless mobile device 110 changes the scanning-station period to the first scanning-station period to scan for the station in the region where the wireless mobile device 110 is located.

It should be noted that, if the wireless mobile device 110 is unable to transmit the first geographic information (on the other hand, when the first station 120a cannot provide sufficient signal strength for communicating with the wireless mobile device 110, the wireless mobile device 110 is unable to transmit the first geographic information) or the wireless mobile device 110 notifies the user for agreeing whether to transmit the first geographic information or not. If the user does not agree to transmit the first geographic information, the wireless mobile device 110 keeps the original mechanism to scan for the station in the region where the wireless mobile device 110 is located, according to the fixed scanning-station period pre-stored in the wireless mobile device 110.

It should be noted that, because the signal strength is weak between the station service range and the maximum station service range, when the system service server 130 detects (realizes) that the wireless mobile device 110 is between the station service range and the maximum station service range through the first station 120a, the system service server 130 shortens the scanning-station period of the wireless mobile device 110 through the first station 120a. By shortening the scanning-station period, the wireless mobile device 110 is able to avoid handoff failure.

With respect to the moving wireless mobile device 110, the discussion is made in more detail below. When the wireless mobile device 110 proceeds away from the first station 120a, the wireless mobile device 110 shortens the scanning-station period to avoid a handoff failure. In contrast, because it takes more electric power for the wireless mobile device 110 to perform a scan, when the wireless mobile device 110 does not stray far from the first station 120a, the wireless mobile device 110 keeps the original scanning-station period and does not shorten the scanning-station period, to avoid excessive power consumption.

When the wireless mobile device 110 moves, if the motion speed of the wireless mobile device 110 is not greater than the first threshold velocity, or the angle at which the wireless mobile device changes 110 its direction of motion is not greater than the first threshold steering angle, it makes sure that after the first scanning-station period (that is to say, the next time that the wireless mobile device 110 performs a scan), the wireless mobile device 110 is not too far away from the first station 120a to require handoff to another service station. Therefore, the wireless mobile device 110 scans the first station 120a according to the original first scanning-station period without changing to another scanning-station period.

When the motion speed of the wireless mobile device is greater than the first threshold velocity or the angle at which the wireless mobile device 110 changes its direction of motion is greater than the first threshold steering angle, it means that the wireless mobile device 110 will enter an area that is too far away from the first station 120a. If the wireless mobile device 110 still uses the first scanning-station period to perform scanning, it may occur that the first station 120a is not able to provide the wireless mobile device 110 with sufficient signal strength before the next scan and the wireless mobile device 110 does not detect this situation. Therefore, when the motion speed of the wireless mobile device is greater than the first threshold velocity or the angle at which the wireless mobile device 110 changes its direction of motion is greater than the first threshold steering angle, the wireless mobile device transmits the second geographic information to the first station and receives a second scanning-station period, a second threshold velocity, and a second threshold steering angle corresponding to the second geographic information from the first station 120a. Then, the wireless mobile device 110 changes the scanning-station period from the first scanning-station period to the second scanning-station period. Taking the wireless mobile device 110 moving far away from the first station 120a for instance, the second scanning-station period is shorter than the first scanning-station period to avoid a handoff failure. In contrast, if the wireless mobile device 110 moves close to the first station 120a, the second scanning-station period is longer than the first scanning-station period to reduce power consumption, all depending on the requirements.

Similarly, when the motion speed of the wireless mobile device is greater than the second threshold velocity or the angle at which the wireless mobile device 110 changes its direction of motion is greater than the second threshold steering angle, the wireless mobile device transmits third geographic information to the first station and receives a third scanning-station period, a third threshold velocity, and a third threshold steering angle corresponding to the third geographic information from the first station 120a. That is to say, the step of transmitting geographic information is continually repeated in FIG. 2, wherein there is no need to perform the scanning step prior to performing the step of transmitting geographic information by the first station 120a, so as to save on electrical power.

It should be noted that, when the angle at which the wireless mobile device 110 changes its direction of motion is greater than the first threshold steering angle but the motion speed of the wireless mobile device is slower than a minimum motion speed (the minimum motion speed is slower than the first threshold velocity), it means that the wireless mobile device 110 may be moving in a circle rather than moving far away from the first station 120a. Therefore, the wireless mobile device 110 does not transmit the second geographic information to the first station 120a.

Figure 3:
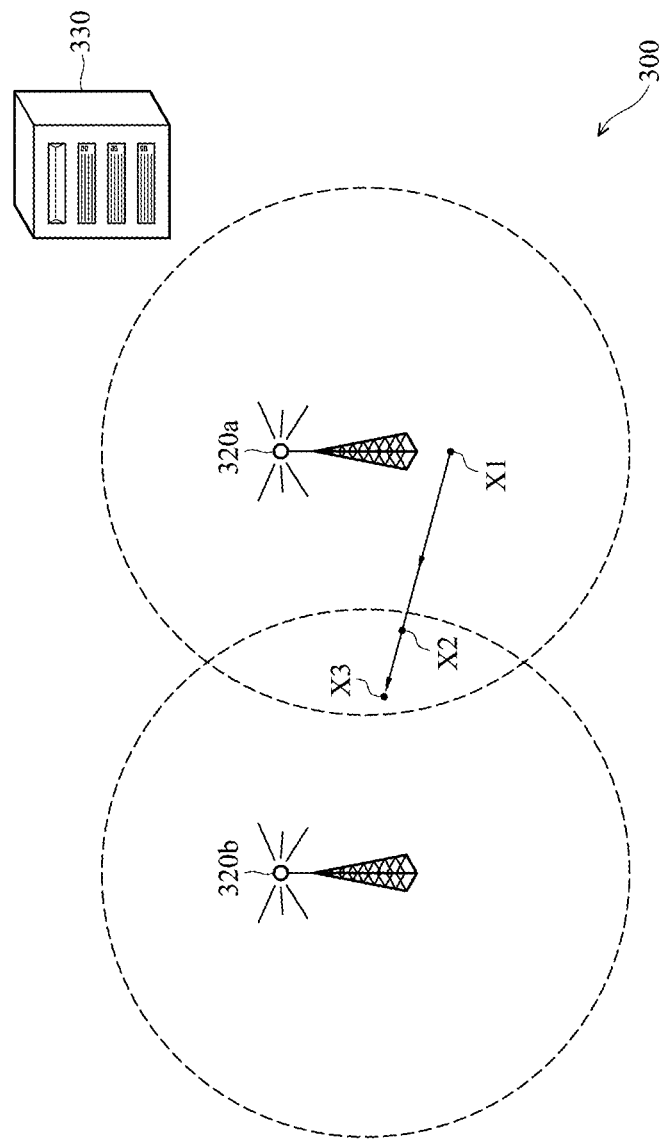
FIG. 3 is a diagram illustrating that the wireless mobile device moves from the first station to the second station, according to an embodiment of the present invention.

FIG. 3 is a diagram illustrating how the wireless mobile device moves from the first station toward the second station, according to an embodiment of the present invention. Compared with FIG. 1, a wireless communication system 300 further comprises a second station 320b. A first station 320a and the second station 320b each have a maximum station service range (denoted by the dotted circle). The wireless mobile device 110 shown in FIG. 1 is not shown in FIG. 3 and the location of a wireless mobile device 310 is represented by the symbol $x_1$, $x_2$, $x_3$. The description below discusses in more detail how the motion speed of the wireless mobile device 310 is not greater than the first threshold velocity and the wireless mobile device 310 does not change its direction of motion. That the motion speed of the wireless mobile device 310 exceeds the threshold velocity or the angle at which the wireless mobile device 310 changes its direction of motion exceeds the threshold steering angle is discussed in the above descriptions, and will not be described again below.

The original location of the wireless mobile device 310 is the location $x_1$ and at this time the wireless mobile device 310 transmits the first geographic information to a system service server 330 through the first station 320a. Then, the wireless mobile device 310 moves from the location $x_1$ to the location $x_2$. When the wireless mobile device 310 is at the location $x_2$, the wireless mobile device 310 scans the first station 320a and the second station 320b at the same time. However, the second station 320b cannot provide sufficient signal strength to the wireless mobile device 310 yet, so the first station 320a is still used by the wireless mobile device 310 to communicate with the system service server 330. When the wireless mobile device 310 moves to the location $x_3$, at this time the system service server 330 determines, according to the first geographic information, that the signal strength transmitted from the first station 320a and received by the wireless mobile device 310 achieves a threshold handoff value which indicates that the wireless mobile device 310 has to change from the first station 320a to the second station 320b, but the wireless mobile device 310 does not hand off to the second station 320b. The system service server 330 then transmits a scan instruction through the first station 320a to the wireless mobile device 310 to ask the wireless mobile device 310 to hand off to the second station 320b.

The wireless mobile device 310 located at the location $x_3$ receives the scan instruction and hereby performs the scan according to the scan instruction. After scanning the first station 320a and the second station 320b, if the wireless mobile device 310 determines that the first station 320a cannot provide sufficient signal strength and the signal strength provided by the second station 320b achieves the threshold handoff value, the wireless mobile device 310 hands off to the second station 320b.

In contrast, after scanning the first station 320a and the second station 320b, if the wireless mobile device 310 determines that the first station 320a is still able to provide sufficient signal strength and the signal strength provided by the second station 320b does not achieve the threshold handoff value, the wireless mobile device 310 does not hand off to the second station 320b.

Based on the descriptions above, in the preferred embodiment of the present invention, the scanning-station period of the wireless mobile device 110 and 310 is changed to reduce power consumption and solve the problem of handoff failure.

The above paragraphs describe many aspects of the invention. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communication system for improving the handoff of wireless mobile devices according to geographic information, comprising:
    a first station; and
    a wireless mobile device, transmitting first geographic information to the first station and receiving from the first station a first scanning-station period, a first threshold velocity, and a first threshold steering angle corresponding to the first geographic information;
    when a motion speed of the wireless mobile device is greater than the first threshold velocity, or an angle at which the wireless mobile device changes its direction of motion is greater than the first threshold steering angle, the wireless mobile device transmits second geographic information to the first station and receives from the first station a second scanning-station period, a second threshold velocity, and a second threshold steering angle corresponding to the second geographic information.

2. The wireless communication system for improving the handoff of a wireless mobile device according to geographic information as claimed in claim 1, wherein
    the first station has a station service range and a maximum station service range; wherein, when the first station detects that the wireless mobile device is located between the station service range and the maximum station service range, the first station shortens the second scanning-station period of the wireless mobile device.

3. The wireless communication system for improving the handoff of the wireless mobile device according to geographic information as claimed in claim 1, wherein
    when the motion speed of the wireless mobile device is slower than a minimum motion speed, the wireless mobile device does not transmit the second geographic information to the first station;
    wherein the first threshold velocity is greater than the minimum motion speed.

4. The wireless communication system for improving the handoff of the wireless mobile device according to geographic information as claimed in claim 1, wherein
    the second scanning-station period is shorter than the first scanning-station period.

5. The wireless communication system for improving the handoff of the wireless mobile device according to geographic information as claimed in claim 1, further comprising:
    a second station;
    a system service server;
    when the system service server determines, according to the first geographic information, that a signal strength transmitted from the first station and received by the wireless mobile device achieves a threshold handoff value which indicates that the wireless mobile device has to be handed off from the first station to the second station, but the wireless mobile device does not hand off to the second station, the system service server transmits a scan instruction through the first station to the wireless mobile device to ask the wireless mobile device to hand off to the second station.

6. The wireless communication system for improving the handoff of the wireless mobile device according to geographic information as claimed in claim 1, wherein
    the system service server computes the first scanning-station period, the first threshold velocity, and the first threshold steering angle corresponding to the first geographic information according to the first geographic information transmitted from the first station.

7. A method for improving the handoff of wireless mobile devices according to geographic information, comprising:
    transmitting first geographic information from a wireless mobile device to a first station; and
    receiving a first scanning-station period, a first threshold velocity, and a first threshold steering angle corresponding to the first geographic information, from the first station to the wireless mobile device;
    when the wireless mobile device detects that its motion speed is greater than the first threshold velocity or detects that an angle deviating from its direction of motion is greater than the first threshold steering angle, the wireless mobile device transmits second geographic information to the first station and receives a second scanning-station period, a second threshold velocity, and a second threshold steering angle corresponding to the second geographic information from the first station.

8. The method for improving the handoff of wireless mobile devices according to geographic information as claimed in claim 7, wherein
    the second scanning-station period is shorter than the first scanning-station period.

9. The method for improving the handoff of wireless mobile devices according to geographic information as claimed in claim 7, further comprising:
   when the motion speed of the wireless mobile device is slower than a minimum motion speed, the wireless mobile device does not transmit the second geographic information to the first station;
   wherein the first threshold velocity is greater than the minimum motion speed.

10. The method for improving the handoff of wireless mobile devices according to geographic information as claimed in claim 7, further comprising:
   when a system service server determines, according to the first geographic information, that a signal strength transmitted from the first station and received by the wireless mobile device achieves a threshold handoff value which indicates that the wireless mobile device has to be handed off from the first station to the second station, but the wireless mobile device does not hand off to the second station, the system service server transmits a scan instruction through the first station to the wireless mobile device to ask the wireless mobile device to hand off to the second station.

* * * * *